US011027315B2

(12) United States Patent
Xin et al.

(10) Patent No.: US 11,027,315 B2
(45) Date of Patent: Jun. 8, 2021

(54) ULTRASONIC CLEANING SYSTEM

(71) Applicants: Tyco Electronics (Shanghai) Co. Ltd., Shanghai (CN); TE Connectivity Corporation, Berwyn, PA (US); Innogetic Technology Co., Ltd., Zhuhai (CN)

(72) Inventors: Liming Xin, Shanghai (CN); Yun Liu, Shanghai (CN); Lvhai Hu, Shanghai (CN); Dandan Zhang, Shanghai (CN); Roberto Francisco-Yi Lu, Berwyn, PA (US); Lei Zhou, Shanghai (CN); Kok Wai Wong, Zhuhai (CN)

(73) Assignees: Tyco Electronics (Shanghai) Co. Ltd., Shanghai (CN); TE Connectivity Corporation, Berwyn, PA (US); Innogetic Technology Co., Ltd., Zhuhai (CN)

( * ) Notice: Subject to any disclaimer, the term of this patent is extended or adjusted under 35 U.S.C. 154(b) by 265 days.

(21) Appl. No.: 15/980,849

(22) Filed: May 16, 2018

(65) Prior Publication Data

US 2018/0257114 A1    Sep. 13, 2018

Related U.S. Application Data

(63) Continuation of application No. PCT/IB2016/055550, filed on Sep. 16, 2016.

(30) Foreign Application Priority Data

Sep. 16, 2015 (CN) .......................... 201510589839.8

(51) Int. Cl.
*B08B 3/12* (2006.01)
*G02B 6/38* (2006.01)

(52) U.S. Cl.
CPC .............. *B08B 3/12* (2013.01); *G02B 6/3866* (2013.01); *B08B 2240/02* (2013.01)

(58) Field of Classification Search
CPC ....... B08B 2240/02; B08B 3/12; B08B 3/045; G02B 6/3866
See application file for complete search history.

(56) References Cited

FOREIGN PATENT DOCUMENTS

| JP | 200343298 A | 2/2003 |
|---|---|---|
| JP | 2004109963 A | 4/2004 |
| JP | 2004141778 | 4/2004 |

(Continued)

OTHER PUBLICATIONS

WO2004037452A1 Machine Translation (Year: 2004).*

(Continued)

*Primary Examiner* — Spencer E Bell
(74) *Attorney, Agent, or Firm* — Barley Snyder

(57) ABSTRACT

An ultrasonic cleaning system comprises a cleaning tank containing a cleaning liquid, a moving and holding device configured to move a carrier into the cleaning tank and hold the carrier in the cleaning tank, and an ultrasonic wave generator mounted in the cleaning tank. A plurality of fiber optic ferrules are mounted on the carrier and are immersed in the cleaning liquid when the moving and holding device holds the carrier in the cleaning tank. The ultrasonic wave generator is adapted to emit an ultrasonic wave into the cleaning liquid to clean the fiber optical ferrules immersed in the cleaning liquid.

18 Claims, 2 Drawing Sheets

(56) References Cited

FOREIGN PATENT DOCUMENTS

WO           0217355 A2     2/2002
WO    WO-2004037452 A1 *   5/2004               B08B 3/02

OTHER PUBLICATIONS

PCT International Preliminary Report on Patentability, dated Mar. 20, 2018, 6 pages.
PCT Notification of Transmittal of the International Search Report and the Written Opinion of the International Searching Authority, or the Declaration, International Search Report and Written Opinion of the International Searching Authority, dated Nov. 3, 2016, 10 pages.
Abstract of JP2003043298, dated Feb. 13, 2003, 1 page.
Abstract of JP2004141778, dated May 20, 2004, 1 page.

* cited by examiner

ULTRASONIC CLEANING SYSTEM

CROSS-REFERENCE TO RELATED APPLICATIONS

This application is a continuation of PCT International Application No. PCT/IB2016/055550, filed on Sep. 16, 2016, which claims priority under 35 U.S.C. § 119 to Chinese Patent Application No. 201510589839.8, filed on Sep. 16, 2015.

FIELD OF THE INVENTION

The present invention relates to an ultrasonic cleaning system and, more particularly, to an ultrasonic cleaning system adapted to clean a fiber optic ferrule.

BACKGROUND

A fiber optic connector generally comprises a housing and a fiber optic ferrule mounted in the housing. The fiber optic ferrule has a ferrule and an optical fiber inserted into a bore of the ferrule. A front end of the optical fiber protrudes from a front end face of the ferrule by a predetermined distance. The optical fiber is fixed in the bore of the ferrule by an adhesive filled in the bore of the ferrule.

After the optical fiber is fixed in the bore of the ferrule, the front end face of the fiber optic ferrule is processed. The processing of the front end face of the fiber optic ferrule generally includes polishing the front end face of the fiber optic ferrule, cleaning the polished fiber optic ferrule to remove the polishing powder from the fiber optic ferrule, drying the cleaned fiber optic ferrule, and wiping the front end face of the dried fiber optic ferrule to remove dust from the front end face of the fiber optic ferrule. The cleaning of the fiber optic ferrule is generally performed manually and is therefore inefficient and of inconsistent quality. Furthermore, the fiber optic ferrule is easily damaged during manual cleaning.

SUMMARY

An ultrasonic cleaning system comprises a cleaning tank containing a cleaning liquid, a moving and holding device configured to move a carrier into the cleaning tank and hold the carrier in the cleaning tank, and an ultrasonic wave generator mounted in the cleaning tank. A plurality of fiber optic ferrules are mounted on the carrier and are immersed in the cleaning liquid when the moving and holding device holds the carrier in the cleaning tank. The ultrasonic wave generator is adapted to emit an ultrasonic wave into the cleaning liquid to clean the fiber optical ferrules immersed in the cleaning liquid.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
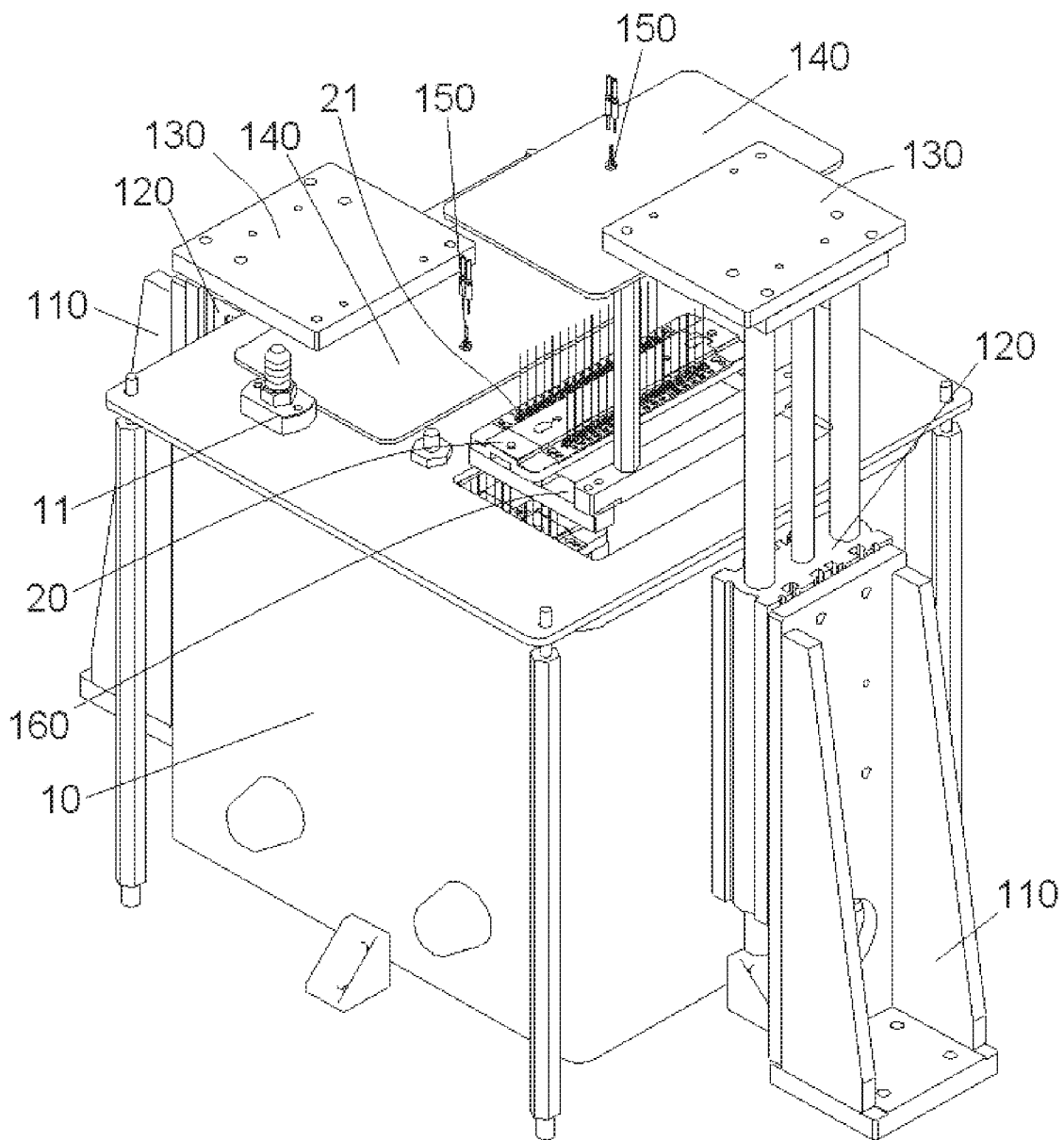
FIG. 1 is a perspective view of an ultrasonic cleaning system according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
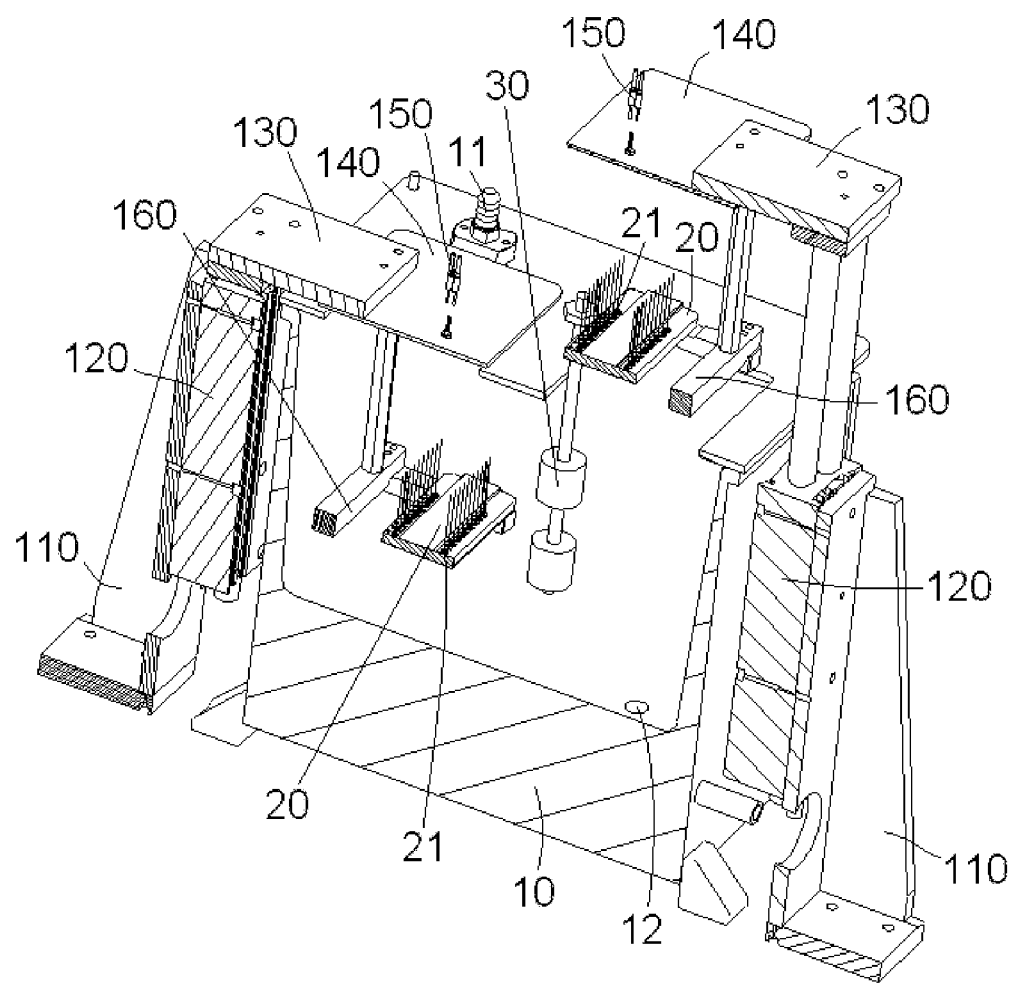
FIG. 2 is a sectional view of the ultrasonic cleaning system of FIG. 1.

An ultrasonic cleaning system according to an embodiment is shown in FIGS. 1 and 2. The ultrasonic cleaning system comprises a cleaning tank 10, a moving and holding device, and an ultrasonic wave generator. The ultrasonic cleaning system is adapted to clean a fiber optic ferrule 21 after the fiber optic ferrule 21 is polished, so as to clean off a polishing powder dust from the fiber optic ferrule 21.

As shown in FIGS. 1 and 2, a cleaning liquid is received in the cleaning tank 10. The moving and holding device is configured to move a carrier 20, on which a plurality of fiber optic ferrules 21 are mounted, into the cleaning tank 10 and hold the carrier 20 in the cleaning tank 10. The ultrasonic wave generator is mounted in the cleaning tank 10 and adapted to emit an ultrasonic wave into the cleaning liquid, so as to clean the fiber optic ferrules 21 immersed in the cleaning liquid of the cleaning tank 10. In an embodiment, when the ultrasonic wave generator emits the ultrasonic wave into the cleaning liquid, the cleaning liquid vibrates and tiny bubbles are produced in the cleaning liquid, cleaning the fiber optic ferrules 21 immersed in the cleaning liquid.

The moving and holding device, as shown in FIGS. 1 and 2, comprises a carrier holder 160 adapted to hold the carrier 20 and a lift mechanism 120 configured to move the carrier holder 160 up and down along a vertical axis. The lift mechanism 120 moves the carrier holder 160 into and out of the cleaning tank 10. The lift mechanism 120 is constructed to move up and down in the vertical direction. In an embodiment, the lift mechanism 120 may comprise a gas cylinder, a hydraulic cylinder or a linear actuator.

A top wall of the cleaning tank 10 has an opening through which the carrier holder 160 and the carrier 20 held on it are introduced into or removed from the cleaning tank 10. As shown in FIGS. 1-2, a cleaning liquid inlet 11 is provided in the top wall of the cleaning tank 10 and a cleaning liquid outlet 12 is provided in the bottom wall of the cleaning tank 10. In an embodiment, a liquid level sensor 30 is mounted in the cleaning tank 10 and adapted to detect a liquid level of the cleaning liquid in the cleaning tank 10. An inlet valve is provided on the cleaning liquid inlet 11. When the liquid level detected by the liquid level sensor 30 is lower than a preset liquid level, the inlet valve is opened, so as to fill the cleaning liquid into the cleaning tank 10 until the liquid level in the cleaning tank 10 reaches the preset liquid level.

The moving and holding device further comprises a cover plate 140 shown in FIGS. 1 and 2 adapted to close or expose the opening in the top wall of the cleaning tank 10. The carrier holder 160 is connected to the cover plate 140 and located below the cover plate 140. The cover plate 140 is connected to a top end of the lift mechanism 120 by a horizontal connection plate 130. The carrier holder 160 is connected to a bottom of the cover plate 140 by a vertical connection rod. A carrier sensor 150 is provided on the cover plate 140 and adapted to detect whether the carrier 20 is held on the carrier holder 160 as well as a state of the carrier 20 held on the carrier holder 160. In an embodiment, the state of the carrier 20 includes the position and the posture of the carrier 20 on the carrier holder 160. In an embodiment, the ultrasonic wave generator is configured to emit the ultrasonic wave into the cleaning liquid only after the opening of the cleaning tank 10 is closed by the cover plate 140, so as to prevent the cleaning liquid from sputtering out of the cleaning tank 10.

In the embodiment shown in FIGS. 1 and 2, the ultrasonic cleaning system comprises a plurality of moving and holding devices, so as to move and hold a plurality of carriers 20 at the same time, simultaneously cleaning the plurality of carriers 20 and further improving the efficiency of cleaning the fiber optic ferrules 21. In other embodiments, the ultrasonic cleaning system may comprise only a single moving and holding device. In this case, the carrier holder 160 may be adapted to hold a plurality of carriers 20 at the same time, so as to simultaneously clean the plurality of carriers 20.

The ultrasonic cleaning system further comprises a support frame 110 shown in FIGS. 1 and 2. In the shown embodiment, the lift mechanism 120 is mounted on the support frame 110. In other embodiments, the lift mechanism 120 may be mounted on the cleaning tank 10 or any fixation base.

A cleaning process of the ultrasonic cleaning system will now be described with reference to FIGS. 1-2.

The carrier 20, on which a plurality of fiber optic ferrules 21 to be cleaned are mounted, is held on the carrier holder 160.

Then, the carrier holder 160 is driven to move down by the lift mechanism 120, transferring the carrier holder 160, the carrier 20, and the fiber optic ferrules 21 into the cleaning tank 10 through the opening in the cleaning tank 10. The opening of the cleaning tank 10 is then closed by the cover plate 140 and the lift mechanism 120 is stopped. At this time, the carrier 20 and the fiber optic ferrules 21 are immersed or submerged in the cleaning liquid of the cleaning tank 10.

Then, the ultrasonic wave generator is turned on to emit the ultrasonic wave into the cleaning liquid, cleaning the carrier 20 and the fiber optic ferrules 21 immerged in the cleaning liquid of the cleaning tank 10. The ultrasonic wave generator is turned off after the fiber optic ferrules 21 have been cleaned.

The carrier holder 160 is then moved up by the lift mechanism 120, moving the cleaned carrier 20 and the cleaned fiber optic ferrules 21 out of the cleaning tank 10. Finally, the cleaned carrier 20 and the cleaned fiber optic ferrules 21 are removed from the carrier holder 160. The ultrasonic cleaning system efficiently cleans the fiber optic ferrules 21, reliably ensuring the quality of the fiber optic ferrules 21 without damaging the fiber optic ferrules 21.

In the above cleaning process, some cleaning liquid, which is attached on the carrier 20 and the fiber optic ferrules 21, may be taken out of the cleaning tank 10, which will cause the liquid level in the cleaning tank 10 to be lower than the preset liquid level of the cleaning tank 10. Once the liquid level sensor 30 detects that the liquid level in the cleaning tank 10 is lower than the preset liquid level, the inlet valve is opened to inject the cleaning fluid into the cleaning tank 10 until the liquid level in the cleaning tank 10 reaches the preset liquid level. The ultrasonic cleaning system prevents the liquid level of the cleaning liquid in the cleaning tank 10 from becoming too low or to a level at which the cleaning liquid cannot effectively clean the fiber optic ferrules 21.

If the cleaning liquid in the cleaning tank 10 is used for a long time and becomes very dirty, it is replaced with unused cleaning liquid. An operator may discharge the used cleaning liquid out of the cleaning tank 10 by opening the cleaning liquid outlet 12, and then fill the unused cleaning liquid into the cleaning tank 10 by opening the cleaning liquid inlet 11.

What is claimed is:

1. An ultrasonic cleaning system, comprising:
   a cleaning tank containing a cleaning liquid and having an opening in a top wall thereof;
   a moving and holding device configured to move a carrier into the cleaning tank through the opening and hold the carrier in the cleaning tank, a plurality of fiber optic ferrules are mounted on the carrier and are immersed in the cleaning liquid when the moving and holding device holds the carrier in the cleaning tank, the moving and holding device comprising:
   a carrier holder adapted to hold the carrier;
   a lift mechanism arranged on a first side of the cleaning tank and configured to move the carrier holder up and down along a vertical axis;
   a horizontal connection plate including a first end and a second end, the second end of the horizontal connection plate attached to a top of the lift mechanism and the first end extending toward the cleaning tank; and
   a cover plate adapted to close or expose the opening in the top wall of the cleaning tank and including a first end connected to the first end of the horizontal connection plate and a second end opposite the first end comprising an unsupported free end when the opening in the top wall of the cleaning tank is exposed; and
   an ultrasonic wave generator mounted in the cleaning tank and adapted to emit an ultrasonic wave into the cleaning liquid to clean the fiber optical ferrules immersed in the cleaning liquid.

2. The ultrasonic cleaning system of claim 1, wherein the lift mechanism moves the carrier holder into and out of the cleaning tank.

3. The ultrasonic cleaning system of claim 1, wherein the carrier holder is connected to the cover plate and positioned below the cover plate along the vertical axis.

4. The ultrasonic cleaning system of claim 3, wherein the carrier holder is connected to a bottom of the cover plate by a vertical connection rod.

5. The ultrasonic cleaning system of claim 3, further comprising a carrier sensor disposed on the cover plate, the carrier sensor adapted to detect whether the carrier is held on the carrier holder and to detect a state of the carrier held on the carrier holder.

6. The ultrasonic cleaning system of claim 3, further comprising a support frame, the lift mechanism is mounted on the support frame or the cleaning tank.

7. The ultrasonic cleaning system of claim 3, wherein the ultrasonic wave generator is configured to emit the ultrasonic wave into the cleaning liquid only after the opening of the cleaning tank is closed by the cover plate.

8. The ultrasonic cleaning system of claim 1, further comprising a liquid level sensor mounted in the cleaning tank and adapted to detect a liquid level of the cleaning liquid in the cleaning tank.

9. The ultrasonic cleaning system of claim 8, wherein a top wall of the cleaning tank has a cleaning liquid inlet and a bottom wall of the cleaning tank has a cleaning liquid outlet.

10. The ultrasonic cleaning system of claim 9, wherein an inlet valve is disposed on the cleaning liquid inlet.

11. The ultrasonic cleaning system of claim 10, wherein the inlet valve is opened to fill the cleaning liquid into the cleaning tank when the liquid level detected by the liquid level sensor is lower than a preset liquid level.

12. The ultrasonic cleaning system of claim 1, wherein the carrier holder simultaneously holds a plurality of carriers.

13. The ultrasonic cleaning system of claim 1, further comprising a plurality of moving and holding devices configured to simultaneously move and hold a plurality of carriers in the cleaning tank.

14. The ultrasonic cleaning system of claim 13, wherein the plurality of moving and holding devices includes a second moving and holding device having a second lift mechanism arranged on a second side of the cleaning tank, opposite the first side of the cleaning tank.

15. An ultrasonic cleaning system, comprising:
a cleaning tank containing a cleaning liquid and having a first opening and a second opening in a top wall thereof;
a first moving and holding device configured to move a first carrier into the cleaning tank through the first opening and hold the first carrier in the cleaning tank, a plurality of fiber optic ferrules are mounted on the first carrier and are immersed in the cleaning liquid when the first moving and holding device holds the first carrier in the cleaning tank, the first moving and holding device comprising:
a first carrier holder adapted to hold the first carrier;
a first lift mechanism arranged on a first side of the cleaning tank and configured to move the first carrier holder up and down along a vertical axis;
a first horizontal connection plate attached to a top of the first lift mechanism and extending toward the cleaning tank; and
a first cover plate connected to the first horizontal connection plate and adapted to close or expose the first opening in the top wall of the cleaning tank;
a second moving and holding device configured to move a second carrier into the cleaning tank simultaneously with the first carrier and through the second opening and hold the second carrier in the cleaning tank, the second moving and holding device comprising:
a second lift mechanism arranged on a second side of the cleaning tank, opposite the first side of the cleaning tank;
a second carrier holder adapted to hold the second carrier;
a second horizontal connection plate attached to a top of the second lift mechanism and extending toward the cleaning tank; and
a second cover plate connected to the second horizontal connection plate and adapted to close or expose the second opening in the top wall of the cleaning tank; and
an ultrasonic wave generator mounted in the cleaning tank and adapted to emit an ultrasonic wave into the cleaning liquid to clean the fiber optical ferrules immersed in the cleaning liquid.

16. The ultrasonic cleaning system of claim 15, wherein the first and second cover plates are connected on respective first ends thereof to the first and second horizontal connection plates, and second ends of the first and second cover plates opposite the first ends comprise unsupported free ends when the first and second openings in the top wall of the cleaning tank are exposed.

17. An ultrasonic cleaning system, comprising:
a cleaning tank containing a cleaning liquid and having at least one opening in a top wall thereof;
a first moving and holding device configured to move a first carrier into the cleaning tank through the at least one opening and hold the first carrier in the cleaning tank, a plurality of fiber optic ferrules are mounted on the first carrier and are immersed in the cleaning liquid when the first moving and holding device holds the first carrier in the cleaning tank, the first moving and holding device comprising:
a first carrier holder adapted to hold the first carrier;
a first lift mechanism configured to move the first carrier into the cleaning tank;
a first horizontal connection plate attached to a moveable end of the first lift mechanism and extending toward the cleaning tank; and
a first cover plate connected to the first horizontal connection plate and adapted to close or expose at least a portion of the at least one opening in the top wall of the cleaning tank;
a second moving and holding device configured to move a second carrier into the cleaning tank through the at least one opening and hold the second carrier in the cleaning tank, the second moving and holding device comprising:
a second lift mechanism configured to move the second carrier into the cleaning tank;
a second carrier holder adapted to hold the second carrier;
a second horizontal connection plate attached to a moveable end of the second lift mechanism and extending toward the cleaning tank; and
a second cover plate connected to the second horizontal connection plate and adapted to, with the first cover plate, close or expose the at least one opening in the top wall of the cleaning tank; and
an ultrasonic wave generator mounted in the cleaning tank and adapted to emit an ultrasonic wave into the cleaning liquid to clean the fiber optical ferrules immersed in the cleaning liquid.

18. The ultrasonic cleaning system of claim 17, wherein the first cover plate is connected to a first end of the first horizontal connection plate, and a second end of the first horizontal connection plate opposite the first end is connected to the top of the first lift mechanism, and wherein a first end of the first cover plate is connected to the first end of the first horizontal connection plate and a second end of the first cover plate opposite the first end comprises an unsupported free end when the at least one opening in the top wall of the cleaning tank is exposed.

* * * * *